US012120684B2

(12) United States Patent
Ji et al.

(10) Patent No.: US 12,120,684 B2
(45) Date of Patent: Oct. 15, 2024

(54) METHODS AND APPARATUSES FOR TRANSMITTING AND RECEIVING SIDELINK DATA

(71) Applicant: FUJITSU LIMITED, Kawasaki (JP)

(72) Inventors: Pengyu Ji, Beijing (CN); Jian Zhang, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 393 days.

(21) Appl. No.: 17/505,929

(22) Filed: Oct. 20, 2021

(65) Prior Publication Data
US 2022/0046628 A1 Feb. 10, 2022

Related U.S. Application Data

(63) Continuation of application No. PCT/CN2019/085263, filed on Apr. 30, 2019.

(51) Int. Cl.
| | | |
|---|---|---|
| H04W 72/20 | (2023.01) | |
| H04L 12/18 | (2006.01) | |
| H04W 4/40 | (2018.01) | |
| H04W 72/044 | (2023.01) | |

(52) U.S. Cl.
CPC ........... *H04W 72/20* (2023.01); *H04L 12/189* (2013.01); *H04W 4/40* (2018.02); *H04W 72/044* (2013.01)

(58) Field of Classification Search
CPC ....... H04L 1/08; H04L 1/1854; H04L 1/1861; H04L 1/189; H04L 1/1896; H04L 12/1863; H04L 12/189; H04L 2001/0093; H04L 5/0032; H04L 5/0037; H04L 5/0053; H04L 5/0055; H04L 5/0094; H04W 4/40; H04W 72/044; H04W 72/0453; H04W 72/20; H04W 92/18
See application file for complete search history.

(56) References Cited

U.S. PATENT DOCUMENTS

| | | | |
|---|---|---|---|
| 10,320,519 B1 * | 6/2019 | Kothari | ............ H04W 28/0278 |
| 11,570,757 B2 * | 1/2023 | Panteleev | ........... H04W 40/246 |
| 11,589,349 B2 * | 2/2023 | Park | ..................... H04L 1/1854 |

(Continued)

FOREIGN PATENT DOCUMENTS

| | | |
|---|---|---|
| CN | 106793092 A | 5/2017 |
| CN | 107079437 A | 8/2017 |

(Continued)

OTHER PUBLICATIONS

U.S. Appl. No. 62/838,042 (Year: 2019).*

(Continued)

*Primary Examiner* — Dung B Huynh
(74) *Attorney, Agent, or Firm* — Myers Wolin, LLC

(57) ABSTRACT

Methods and apparatuses for transmitting and receiving sidelink data. The method includes: receiving by a second terminal equipment sidelink control information and sidelink data transmitted by a first terminal equipment; at least according to one or more frequency-domain resources of the sidelink data indicated in the sidelink control information, determining a resource block in which one of at least two sidelink feedback channels for the sidelink data is located; and transmitting feedback information to the first terminal equipment by using the sidelink feedback channel.

12 Claims, 6 Drawing Sheets

(56) References Cited

U.S. PATENT DOCUMENTS

| | | | | |
|---|---|---|---|---|
| 11,601,228 | B2* | 3/2023 | Bharadwaj | H04L 5/1469 |
| 2004/0014482 | A1* | 1/2004 | Kwak | H04N 19/31 |
| | | | | 455/524 |
| 2004/0029586 | A1* | 2/2004 | Laroia | H04W 52/028 |
| | | | | 455/434 |
| 2005/0026597 | A1* | 2/2005 | Kim | H04W 48/12 |
| | | | | 455/403 |
| 2005/0090278 | A1* | 4/2005 | Jeong | H04W 36/0007 |
| | | | | 455/525 |
| 2005/0185630 | A1* | 8/2005 | Aoki | H04W 72/30 |
| | | | | 370/349 |
| 2008/0090583 | A1* | 4/2008 | Wang | H04W 72/121 |
| | | | | 714/751 |
| 2009/0303937 | A1* | 12/2009 | Sawahashi | H04W 74/02 |
| | | | | 370/329 |
| 2009/0305712 | A1* | 12/2009 | Franceschini | H04W 52/08 |
| | | | | 455/450 |
| 2010/0128648 | A1* | 5/2010 | Lee | H04W 74/002 |
| | | | | 370/312 |
| 2010/0232339 | A1* | 9/2010 | Jung | H04L 1/1692 |
| | | | | 370/312 |
| 2015/0304090 | A1* | 10/2015 | Ko | H04B 7/024 |
| | | | | 370/329 |
| 2016/0192420 | A1* | 6/2016 | Kim | H04W 4/06 |
| | | | | 370/329 |
| 2017/0026151 | A1* | 1/2017 | Adachi | H04W 72/0453 |
| 2017/0347394 | A1 | 11/2017 | Yasukawa et al. | |
| 2018/0116007 | A1* | 4/2018 | Yasukawa | H04W 72/1263 |
| 2018/0139774 | A1* | 5/2018 | Ma | H04L 1/189 |
| 2018/0324828 | A1* | 11/2018 | Mukherjee | H04W 16/14 |
| 2019/0007974 | A1* | 1/2019 | Nguyen | H04L 67/12 |
| 2019/0052436 | A1* | 2/2019 | Desai | H04W 72/0446 |
| 2019/0116004 | A1* | 4/2019 | Goto | H04L 1/16 |
| 2019/0132861 | A1* | 5/2019 | Koorapaty | H04L 1/1861 |
| 2019/0132866 | A1* | 5/2019 | Goto | H04L 5/00 |
| 2019/0159139 | A1* | 5/2019 | Yamada | H04W 52/365 |
| 2019/0191314 | A1* | 6/2019 | Mueck | H04W 16/06 |
| 2019/0208530 | A1* | 7/2019 | Gao | H04W 72/12 |
| 2019/0215822 | A1* | 7/2019 | Zhang | H04W 72/51 |
| 2019/0327724 | A1 | 10/2019 | Zhao | |
| 2020/0029318 | A1* | 1/2020 | Guo | H04L 1/1822 |
| 2020/0037343 | A1* | 1/2020 | He | H04W 28/0268 |
| 2020/0059935 | A1* | 2/2020 | Qian | H04W 72/52 |
| 2020/0112400 | A1* | 4/2020 | Lee | H04L 1/1819 |
| 2020/0235868 | A1* | 7/2020 | Yu | H04W 76/28 |
| 2020/0260214 | A1* | 8/2020 | Wu | H04W 4/12 |
| 2020/0260231 | A1* | 8/2020 | Ganesan | H04B 7/0695 |
| 2020/0305174 | A1* | 9/2020 | Ganesan | H04W 4/029 |
| 2020/0305176 | A1* | 9/2020 | Hu | H04B 7/0626 |
| 2020/0328852 | A1* | 10/2020 | Tang | H04W 24/10 |
| 2020/0336253 | A1* | 10/2020 | He | H04W 76/11 |
| 2020/0344722 | A1* | 10/2020 | He | H04W 72/0446 |
| 2020/0389901 | A1* | 12/2020 | Kimba Dit Adamou | H04W 48/20 |
| 2021/0014023 | A1* | 1/2021 | Zheng | H04L 5/0044 |
| 2021/0076236 | A1* | 3/2021 | Kimura | H04W 16/18 |
| 2021/0127364 | A1* | 4/2021 | Panteleev | H04L 1/1819 |
| 2021/0167926 | A1* | 6/2021 | Lin | H04L 1/1858 |
| 2021/0185715 | A1* | 6/2021 | Shen | H04L 5/0032 |
| 2021/0235423 | A1* | 7/2021 | Yang | H04W 48/02 |
| 2021/0266110 | A1* | 8/2021 | Wang | H04L 1/1896 |
| 2021/0297199 | A1* | 9/2021 | Miao | H04L 5/0048 |
| 2021/0297221 | A1* | 9/2021 | Lee | H04L 1/1812 |
| 2021/0298071 | A1* | 9/2021 | Shimomura | H04W 74/04 |
| 2021/0306824 | A1* | 9/2021 | Li | H04W 4/40 |
| 2021/0306999 | A1* | 9/2021 | Zhao | H04L 5/0094 |
| 2021/0321380 | A1* | 10/2021 | Zhao | H04L 1/1896 |
| 2021/0329603 | A1* | 10/2021 | Zhao | H04W 72/542 |
| 2021/0344473 | A1* | 11/2021 | Sun | H04L 1/1861 |
| 2021/0345313 | A1* | 11/2021 | Basu Mallick | H04L 1/1825 |
| 2021/0345396 | A1* | 11/2021 | Yu | H04W 72/23 |
| 2021/0377912 | A1* | 12/2021 | El Hamss | H04L 1/1854 |
| 2022/0006569 | A1* | 1/2022 | Lee | H04W 72/02 |
| 2022/0053428 | A1* | 2/2022 | Hwang | H04W 52/367 |
| 2022/0053496 | A1* | 2/2022 | Yu | H04L 1/1896 |
| 2022/0070847 | A1* | 3/2022 | Yoshioka | H04W 4/40 |
| 2022/0085923 | A1* | 3/2022 | Ye | H04L 1/1825 |
| 2022/0086602 | A1* | 3/2022 | Ashraf | H04W 4/44 |
| 2022/0103292 | A1* | 3/2022 | Hwang | H04L 1/1812 |
| 2022/0116894 | A1* | 4/2022 | Yokomakura | H04W 56/0015 |
| 2022/0116996 | A1* | 4/2022 | Lee | H04W 4/40 |
| 2022/0140957 | A1* | 5/2022 | Kiilerich Pratas | H04L 5/0055 |
| | | | | 370/329 |
| 2022/0159497 | A1* | 5/2022 | Lee | H04L 1/1812 |
| 2022/0167207 | A1* | 5/2022 | Park | H04W 28/0278 |
| 2022/0182866 | A1* | 6/2022 | Lee | H04L 5/0048 |
| 2022/0182979 | A1* | 6/2022 | Freda | H04W 72/56 |
| 2022/0190984 | A1* | 6/2022 | Lee | H04L 1/0026 |
| 2022/0201654 | A1* | 6/2022 | Lee | H04W 72/20 |
| 2022/0201711 | A1* | 6/2022 | Lee | H04W 72/20 |
| 2022/0201729 | A1* | 6/2022 | Hosseini | H04L 1/1685 |
| 2022/0256504 | A1* | 8/2022 | Lin | H04L 1/1864 |
| 2022/0311582 | A1* | 9/2022 | Ye | H04W 76/14 |
| 2022/0399962 | A1* | 12/2022 | Lee | H04W 72/543 |
| 2023/0232422 | A1* | 7/2023 | Lee | H04W 72/232 |
| | | | | 370/329 |
| 2023/0336280 | A1* | 10/2023 | Si | H04L 1/1822 |
| 2024/0039680 | A1* | 2/2024 | Selvanesan | H04L 5/0055 |

FOREIGN PATENT DOCUMENTS

| | | |
|---|---|---|
| CN | 108322414 A | 7/2018 |
| CN | 109691146 A | 4/2019 |
| WO | 2018/222099 A1 | 12/2018 |

OTHER PUBLICATIONS

Second Notification of Office Action and Search Report issued by the China National Intellectual Property Administration for corresponding Chinese Patent Application No. 201980095396.3, mailed on Dec. 20, 2023, with an English translation.

International Search Report and Written Opinion of the International Searching Authority issued by the China National Intellectual Property Administration for corresponding International Patent Application No. PCT/CN2019/085263, mailed on Jan. 23, 2020, with an English translation.

Huawei et al., "Design and contents of PSCCH and PSFCH", Agenda Item: 7.2.4.1.5, 3GPP TSG-RAN WG1 Meeting #95, R1-1813554, Spokane, USA, Nov. 12-16, 2018.

Intel Corporation, "Design of physical layer procedures for NR V2X sidelink communication", Agenda Item: 7.2.4.5, 3GPP TSG-RAN WG1 RAN1 Meeting #96bis, R1-1904299, Xi'an, China, Apr. 8-12, 2019.

ITL, "Discussion on NR V2X HARQ mechanism", Agenda Item: 7.2.4.1.2, 3GPP TSG-RAN WG1 Meeting #95, R1-1813976, Spokane, USA, Nov. 12-16, 2018.

* cited by examiner

METHODS AND APPARATUSES FOR TRANSMITTING AND RECEIVING SIDELINK DATA

CROSS-REFERENCE TO RELATED APPLICATION

This application is a continuation application of International Application PCT/CN2019/085263 filed on Apr. 30, 2019 and designated the U.S., the entire contents of which are incorporated herein by reference.

TECHNICAL FIELD

This disclosure relates to the field of communication technologies.

BACKGROUND

In Long Term Evolution (LTE) system Rel-15 and previous versions of the vehicle to everything (V2X) communications, only broadcast services are supported, and after receiving data packets transmitted by a terminal equipment as a transmitter (hereinafter referred to as a transmitter terminal equipment), a terminal equipment as a receiver (hereinafter referred to as a receiver terminal equipment) does not need to transmit feedback information (including ACK/NACK).

In New Radio (NR) V2X, in addition to broadcast services, unicast and groupcast services need also be supported. In order to enhance reliability of these two types of services, a sidelink (SL) feedback mechanism is introduced in NR V2X, that is, the receiver terminal equipment needs to feed back to the transmitter terminal equipment after receiving data packets, and contents that are fed back depend on decoding results. Therefore, a physical sidelink feedback channel (PSFCH) is introduced into the sidelink for carrying feedback information of the sidelink.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when there exists a one-to-many relationship between a physical sidelink shared channel (PSSCH) transmitting sidelink data and a PSFCH, collision may be caused between PSFCH resources, thereby resulting in that a transmitter terminal equipment is unable to correctly receive feedback information transmitted by a receiver terminal equipment.

Addressed to at least one of the above problems, embodiments of this disclosure provide methods and apparatuses for transmitting and receiving sidelink data.

According to a first aspect of the embodiments of this disclosure, there is provided a method for receiving sidelink data, including:
  receiving, by a second terminal equipment, sidelink control information and sidelink data transmitted by a first terminal equipment;
  at least according to one or more frequency-domain resources of the sidelink data indicated in the sidelink control information, determining, by the second terminal equipment, a resource block in which one of at least two sidelink feedback channels for the sidelink data is located; and
  transmitting feedback information by the second terminal equipment to the first terminal equipment by using the sidelink feedback channel.

According to a second aspect of the embodiments of this disclosure, there is provided an apparatus for receiving sidelink data, including:
  a receiving unit configured to receive sidelink control information and sidelink data transmitted by a first terminal equipment;
  a determining unit configured to, at least according to one or more frequency-domain resources of the sidelink data indicated in the sidelink control information, determine a resource block in which one of at least two sidelink feedback channels for the sidelink data is located; and
  a transmitting unit configured to transmit feedback information to the first terminal equipment by using the sidelink feedback channel.

According to a third aspect of the embodiments of this disclosure, there is provided a method for transmitting sidelink data, including:
  transmitting sidelink control information and sidelink data by a first terminal equipment to a second terminal equipment; wherein one or more frequency-domain resources of the sidelink data indicated in the sidelink control information is/are at least used by the second terminal equipment to determine a resource block where one of at least two sidelink feedback channels for the sidelink data is located; and
  receiving, by the first terminal equipment, feedback information transmitted by the second terminal equipment.

According to a fourth aspect of the embodiments of this disclosure, there is provided an apparatus for transmitting sidelink data, including:
  a transmitting unit configured to transmit sidelink control information and sidelink data to a second terminal equipment; wherein one or more frequency-domain resources of the sidelink data indicated in the sidelink control information is/are at least used by the second terminal equipment to determine a resource block where one of at least two sidelink feedback channels for the sidelink data is located; and
  a receiving unit configured to receive feedback information transmitted by the second terminal equipment.

According to a fifth aspect of the embodiments of this disclosure, there is provided a communication system, including:
  a first terminal equipment configured to transmit sidelink control information and sidelink data to a second terminal equipment, and receive feedback information transmitted by the second terminal equipment; and
  the second terminal equipment configured to receive the sidelink control information and the sidelink data, at least according to one or more frequency-domain resources of the sidelink data indicated in the sidelink control information, determine a resource block in which one of at least two sidelink feedback channels for the sidelink data is located, and transmit the feedback information by using the sidelink feedback channel.

An advantage of the embodiments of this disclosure exists in that at least according to one or more frequency-domain resources of the sidelink data, the receiver terminal equipment determines a resource block in which one of at least two sidelink feedback channels for the sidelink data is located. Hence, even though there exists a one-to-many relationship between a PSSCH transmitting the sidelink data and a PSFCH, collision between PSFCH resources may be avoided, and the transmitter terminal equipment may be able to correctly receive feedback information transmitted by the receiver terminal equipment.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
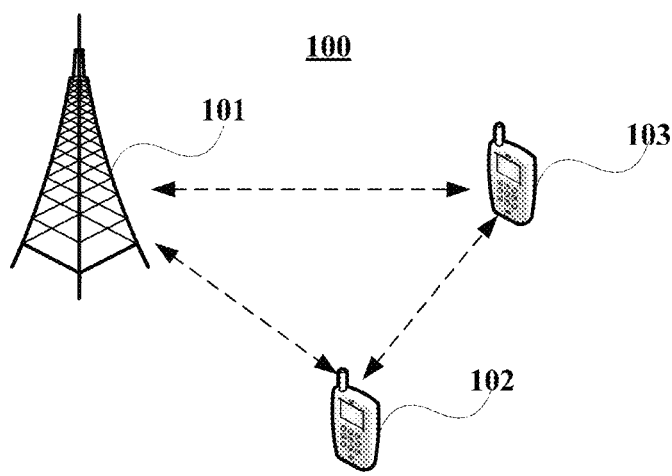
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (genescalen), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In addition, the term "network side" or "network device side" refers to one side of the network, which may be a certain base station, and may also include one or more network devices as described above. The term "user side" or "terminal side" or "terminal equipment side" refers to a side of a user or a terminal, which may be a certain UE, and may also include one or more terminal equipments as described above. Unless otherwise specified in this text, "equipment" may refer to a network device, or may refer to a terminal equipment.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and terminal equipments 102, 103. For the sake of simplicity, an example having only two terminal equipments and one network device is schematically given in FIG. 3; however, the embodiment of this disclosure is not limited thereto.

In the embodiment of this disclosure, existing traffics or traffics that may be implemented in the future may be performed between the network device 101 and the terminal equipments 102, 103. For example, such traffics may include but not limited to enhanced mobile broadband (eMBB), massive machine type communication (MTC), and ultra-reliable and low-latency communication (URLLC), etc.

It should be noted that FIG. 1 shows that two terminal equipments 102 and 103 are both within the coverage of the network device 101; however, the embodiment of this disclosure is not limited thereto. The two terminal equipments 102 and 103 may not be within the coverage of the network device 101, or one terminal equipment 102 is within the coverage of the network device 101 and the other terminal equipment 103 is outside the coverage of the network device 101.

In the embodiment of this disclosure, sidelink transmission may be performed between the two terminal equipments 102 and 103. For example, the two terminal equipments 102 and 103 may both perform sidelink transmission within the coverage area of the network device 101 to implement V2X communication, or both may perform sidelink transmission outside the coverage area of the network device 101 to implement V2X communication, or terminal equipment 102 within the coverage area of the network device 101 and terminal equipment 103 outside the coverage area of the network device 101 perform sidelink transmission to implement V2X communication.

In the embodiment of this disclosure, a sidelink resource may be allocated by the network device (i.e. by using Mode 1). The terminal equipment 102 and/or 103 may also independently select a sidelink resource (i.e. by using Mode 2), in which case the sidelink transmission may be independent of the network device 101, that is, the network device 101 is optional. In addition, autonomously selecting a sidelink resource by the terminal equipment (i.e. by using Mode 2) and allocating a sidelink resource by the network device (i.e. by using Mode 1) may be combined; however, it is not limited in the embodiments of this disclosure.

In the embodiment of this disclosure, it is assumed that a format at least supporting that a PSFCH occupies a number of last symbols of a slot is determined, that a time interval between the PSFCH and a PSSCH in the time domain is semi-statically configured is determined and an N-th slot in every N slots may contain the PSFCH and the rest of the slots do not contain a PSFCH; and each slot containing a PSFCH needs to perform feedback on several previous PSSCH transmissions, and a value of which is assumed to be N in the embodiments of this disclosure, that is, N may be called a period of the PSFCH resource.

Figure 2:
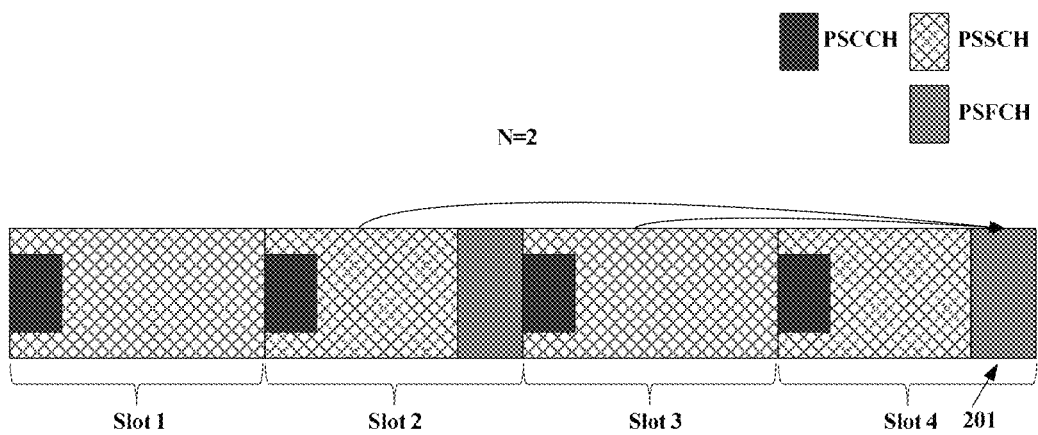
FIG. 2 is a schematic diagram of a PSFCH resource of an embodiment of this disclosure.

FIG. 2 is a schematic diagram of the PSFCH resource of the embodiment of this disclosure, schematically showing a relationship between a PSSCH and a PSFCH performing feedback thereon when a feedback period N=2. In FIG. 2, it is assumed that the receiver terminal equipment needs a time of one slot (such as slot 4 shown in FIG. 2) to demodulate and decode the PSSCH and generate feedback information (HARQ-ACK). Therefore, PSFCHs (such as two) on one or more symbols shown by 201 perform feedback on a PSSCH of slot 2 and a PSSCH of slot 3, respectively.

If a correspondence relationship between a PSFCH and a PSSCH is established in the frequency domain, a frequency domain resource to which the PSSCH (following description shall be given by taking a sub-channel as an example) corresponds may be used to determine a frequency-domain starting position of the PSFCH. In this way, after the PSSCH resource is selected, a corresponding PSFCH resource may be determined, hence, the receiver terminal equipment does not need to perform resource sensing and selection on the PSFCH.

The above mechanism is applicable to a case where there exists a one-to-one correspondence between the PSSCH and the PSFCH, such as a unicast scenario (sidelink data in this scenario are hereinafter referred to as unicast data) or some groupcast scenarios (all receiver terminal equipments in a group transmit feedback information in a shared PSFCH and only feeds back NACK, such scenarios are referred to as op.1 groupcast, and sidelink data in these scenarios are referred to as first groupcast data).

However, for a case where there exists a one-to-many relationship between PSSCHs and PSFCHs, such as some other scenarios of groupcast (where receiver terminal equipments in a group transmit feedback information on respective PSFCHs separately, and feed back no matter whether a result is ACK or NACK, and such scenarios are referred to as op.2 groupcast, and sidelink data in such scenarios are referred to as second groupcast data), as in this case the PSSCHs and PSFCHs are not in a one-to-one correspondence, but are in a one-to-many correspondence, it is possible that two receiver terminal equipments select identical PSFCH resources for performing feedback, thereby causing collisions between PSFCH resources.

In the embodiments of this disclosure, V2X is taken as an example to describe sidelink PSFCHs. However, this disclosure is not limited thereto, and it may also be applicable to sidelink transmission scenarios other than V2X. In the following description, without causing confusion, the terms "sidelink" and "V2X" are interchangeable, the terms "resource block" and "PRB" are interchangeable, and the terms "PSFCH" and "sidelink feedback channel" are interchangeable, and the terms "PSSCH" and "sidelink data channel" or "sidelink data" may also be interchangeable.

Embodiment 1

The embodiments of this disclosure provide a method for transmitting and receiving sidelink data, which shall be described from a receiver terminal equipment (referred to as a second terminal equipment) side, wherein the second terminal equipment is a receiver, and receives sidelink data transmitted by a transmitter terminal equipment (referred to as a first terminal equipment).

Figure 3:
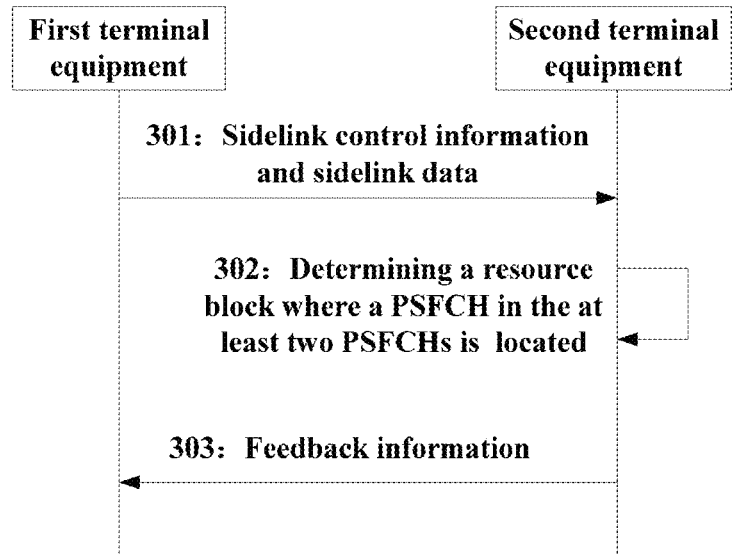
FIG. 3 is a schematic diagram of a method for transmitting and receiving sidelink data of an embodiment of this disclosure.

FIG. 3 is a schematic diagram of a method for transmitting and receiving sidelink data of the embodiment of this disclosure. As shown in FIG. 3, the method includes:

step 301: a second terminal equipment receives sidelink control information and sidelink data transmitted by a first terminal equipment;

step 302: at least according to one or more frequency-domain resources of the sidelink data indicated in the sidelink control information, the second terminal equipment determines a resource block in which one of at least two sidelink feedback channels for the sidelink data is located; and step 303: the second terminal equipment transmits feedback information to the first terminal equipment by using the sidelink feedback channel.

In an embodiment, the sidelink control information (SCI) is carried by a physical sidelink control channel (PSCCH), the sidelink data are carried by PSSCHs, and the sidelink feedback information is carried by a PSFCH.

It should be noted that FIG. 3 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 3.

In an embodiment, the sidelink data may include one of the following: unicast data, first groupcast data, and second groupcast data, the unicast data being transmitted by the first terminal equipment to the second terminal equipment, the first groupcast data being transmitted by the first terminal equipment to at least two second terminal equipments, the at least two second terminal equipments transmitting feedback information in the same sidelink feedback channel, the second groupcast data being transmitted by the first terminal equipment to at least two second terminal equipments, and the at least two second terminal equipments respectively transmitting feedback information in at least two sidelink feedback channels. However, this disclosure is not limited to specific service types; for example, it is also applicable to scenarios where data are transmitted based on groups and feedback is performed.

Following description shall be given by taking configuring first time-frequency resources corresponding to multiple PSFCHs as an example.

In an embodiment, the second terminal equipment and/or the first terminal equipment may be configured or pre-configured with sidelink resource pool configuration information; wherein the sidelink resource pool configuration information includes first indication information used for indicating that a first time-frequency resource corresponds to at least two sidelink feedback channels. The first terminal equipment as a transmitter is configured with a transmission resource pool, the second terminal equipment as a receiver is configured with a reception resource pool, and for the same resource pool, the receiver and the transmitter may reach agreement (or called alignment) on understandings.

For example, the sidelink resource pool configuration information may be configured by the network device, or may be configured by the terminal equipment (such as the first terminal equipment or other terminal equipments in the group), or may be pre-configured (such as being pre-configured before shipment, of course, it may also be pre-configured after shipment).

For example, when a sidelink resource pool is configured, an information element (IE) for configuring the resource pool may include indication information indicating a specific time-frequency resource (referred to as a first time-frequency resource) in the resource pool. The first time-frequency resource includes one or more indicated slots (specific slots) in the time domain and includes a first sub-channel (specific sub-channel) in the frequency domain. One or more first time-frequency resources may be configured in the sidelink resource pool configuration information, the number of PSFCH resources to which each first time-frequency resource corresponds is more than one.

In the following description, the first time-frequency resource may be deemed as being specific both in the time domain and the frequency domain, and the second time-frequency resource may be deemed as being different from the first time-frequency resource in the time domain, or being different from the first time-frequency resource in the frequency domain, or being different from the first time-frequency resource in both the time domain and the frequency domain.

In an embodiment, the first time-frequency resource may be selected by the first terminal equipment and used as a frequency-domain starting resource for transmitting sidelink data, and is used by the second terminal equipment to determine a frequency-domain resource of multiple feedback channels to which multiple sidelink data selecting a current sub-channel (a first sub-channel) as a frequency-domain starting resource in a period correspond. And the sidelink resource pool configuration information may further include information on the number of the at least two sidelink feedback channels.

For example, resource blocks where multiple PSFCHs to which multiple PSSCHs with identical starting sub-channels in a period correspond may be taken as a set, and the first sub-channel may be used to determine resource blocks contained in the set. For example, PRBs contained in the first sub-channel are taken as set A, and all PRBs to which set A corresponds are determined; or a starting position of the first sub-channel plus M PRBs (M is an integer greater than or equal to 1) is taken as a starting sub-channel of set A, and all PRBs to which set A corresponds are determined.

For another example, the number of PSFCHs of the second groupcast data may be at least two, and the at least two PSFCHs may be taken as a set (a second PSFCH set, which may be denoted by set 2); however, there is only one PSFCH for one unicast data or the first groupcast data. If both unicast data or first groupcast data and the second groupcast data are included in a period, PSFCHs to which the current sub-channel corresponds in the period are taken as a set (a first PSFCH set, which may be denoted by set 1), and set 1 includes set 2 (corresponding to the second groupcast data, including at least two PSFCHs) and other PSFCHs (corresponding to the unicast data or the first groupcast data). Of course, if the unicast data or first groupcast data are included in a period, but the second groupcast data are not included, the PSFCHs to which the period corresponds may still be taken as a set (the first PSFCH set, which may be denoted by set 1).

In an embodiment, the sidelink resource pool configuration information may be configured for each or every multiple periods N in the time domain; wherein the sidelink resource pool configuration information configures one or more sub-channels in one or more slots in the period as the first sub-channel.

In an embodiment, one first time-frequency resource may correspond to one second sidelink feedback channel set for the second groupcast data, the second sidelink feedback channel set including multiple (at least two) sidelink feedback channels.

For example, the second sidelink feedback channel set may be referred to as a PSFCH group or a PSFCH bundle, and the specific number of corresponding PSFCHs may also be configured in the resource pool.

In an embodiment, numbers of sidelink feedback channels to which any two first time-frequency resources configured in the sidelink resource pool configuration information correspond are identical; or, numbers of sidelink feedback channels to which any two first time-frequency resources configured in the sidelink resource pool configuration information correspond are different. That is, for multiple first time-frequency resources configured in the resource pool, numbers of PSFCHs of all the first time-frequency resources may be completely identical or completely different.

In an embodiment, numbers of sidelink feedback channels to which at least two first time-frequency resources configured in the sidelink resource pool configuration information correspond are different, and/or numbers of sidelink feedback channels to which at least two first time-frequency resources correspond are identical. That is, for multiple first time-frequency resources configured in the resource pool, numbers of PSFCHs of some of the first time-frequency resources may be identical, and numbers of PSFCHs of some of the first time-frequency resources may be different.

In an embodiment, the sidelink resource pool configuration information may include second indication information used for indicating whether the sidelink resource pool is used for the second groupcast data; and only when the resource pool configuration information includes the second indication information, the first indication information can be included in the sidelink resource pool configuration information or be determined to be valid by the second terminal equipment.

For example, the IE configuring the resource pool may be included in broadcast system information (SI) or radio resource control (RRC) signaling. Optionally, the configured resource pool may contain indication information on whether it may be used for op.2 groupcast; for example, only when it is indicated on, the resource pool contains indication information for a specific sub-channel used for op.2 groupcast.

In an embodiment, a part of sub-channels in one or more slots are the first sub-channels, corresponding to the second sidelink feedback channel set; or, all sub-channels in one or more slots are the first sub-channels, corresponding to the second sidelink feedback channel set.

For example, these first time-frequency resources may be configured every one or more periods N, or one or more sub-channels of one or more slots correspond to the PSFCH bundle/group, or all sub-channels of one or more slots correspond to the PSFCH bundle/group.

If the transmitter terminal equipment selects the sub-channel in these first time-frequency resources as the starting position of the frequency domain resource for transmitting the sidelink data, the receiver terminal equipment uses a PSFCH resource in a PSFCH bundle/group corresponding to the first time-frequency resource to which the sub-channel corresponds to carry the feedback information.

In an embodiment, when the sidelink data are the second groupcast data, the first terminal equipment selects the first time-frequency resource to determine the frequency domain resource of the sidelink data; and when the sidelink data are unicast data or the first groupcast data, the first terminal equipment selects a second time-frequency resource different from the first time-frequency resource to determine the frequency domain resource of the sidelink data.

In an embodiment, when the sidelink data are unicast data or the first groupcast data, if there are no enough second time-frequency resources, the first terminal equipment further selects the first time-frequency resource to determine the frequency-domain resources of sidelink data.

For example, if the transmitter UE needs to transmit groupcast data and operates in the op.2 mode, the transmitter UE may select the sub-channel (first sub-channel) of the configured first time-frequency resources as the frequency-domain starting sub-channel of PSSCH resources. If the transmitter UE transmits unicast or broadcast data, or transmits groupcast data but operates in op. 1, the transmitter UE preferentially selects the second time-frequency resource other than the configured first time-frequency resource.

For example, other sub-channels (second sub-channels) other than these sub-channels (first sub-channels) in a specific slot may be selected as the frequency-domain starting sub-channels of PSSCH resources; alternatively, only when selectable second time-frequency resources are insufficient, can the sub-channel (first sub-channel) of the configured first time-frequency resource may be selected as the frequency-domain starting sub-channel of the PSSCH resource, or it may be configured that these resources are completely not taken as the frequency domain starting sub-channel.

In an embodiment, there may exist a fixed relationship between the frequency-domain resources (sub-channels) of the PSSCH and the PSFCHs. A resource block of at least one sidelink feedback channel in the at least two sidelink feedback channels may be determined via a sub-channel to which the starting position of the sidelink data corresponds, and resource blocks of other sidelink feedback channels are determined via the resource block of the at least one sidelink feedback channel.

Figure 4:
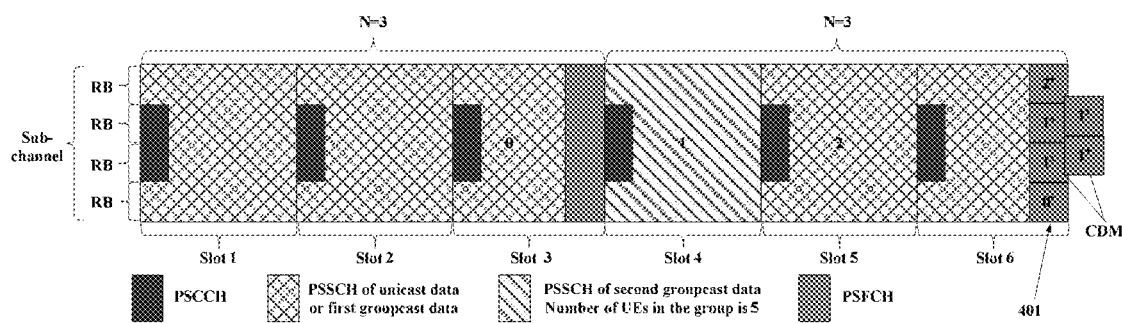
FIG. 4 is an exemplary diagram of a PSFCH resource of an embodiment of this disclosure.

FIG. 4 is an exemplary diagram of the PSFCH resource of the embodiment of this disclosure. As shown in FIG. 4, the period N=3, and the symbol shown by 401 has multiple PSFCHs, corresponding to PSSCHs at slots 3, 4 and 5. In a feedback period, corresponding to the PSFCH resources in the PSFCH bundle/group of the first time-frequency resource (specific slot and specific sub-channel), PSFCH resources corresponding to other time-frequency resources (second time-frequency resources) in the period are numbered together.

As shown in FIG. 4, the number "0" indicates a starting sub-channel of a resource corresponding to unicast, broadcast or op.1 groupcast, which corresponds to a PSFCH resource (indicated by 0'), and is a first slot in the period, then, taking a lowest physical resource block (PRB) in the frequency domain of this sub-channel as a reference point, a first PRB (indicated by 0') is used to feed back the PSSCH numbered "0".

As shown in FIG. 4, the number "1" denotes a sub-channel to which the op.2 groupcast corresponds, which corresponds to 4 PSFCH resources (denoted by 1') and needs two PRBs, i.e. two PRBs marked by "1" adjacent to PSFCH "0", and each PRB has two PSFCH resources for code division.

For example, after 0', a first 1' may be arranged adjacently in the frequency domain, and then a second 1' may be arranged adjacently in a frequency division multiplexing mode; and for a third 1' and a fourth 1', they may be code-divided with a PRB of the first 1' and a PRB of the second 1', respectively. Alternatively, the first 1' may be arranged adjacently in the frequency domain after 0', and the second 1 'may be mapped on the PRB of the first 1' in the code division multiplexing mode; then the third 1' is arranged adjacently in the frequency division multiplexing mode, and the fourth 1' may be mapped on the PRB of the third 1' in the code division multiplexing mode. However, this disclosure is not limited thereto, and for example, they may also be arranged not adjacent to each other.

As shown in FIG. 4, the number "2" denotes a sub-channel to which unicast or broadcast or op.1 groupcast corresponds, which corresponds to a PSFCH resource (denoted by 2') and needs a PRB, i.e. a PRB marked by "2" adjacent to PSFCH "1".

Thus, the PSFCH set shown by 401 may be expressed as set 1={0', set 2, 2'}, and set 2={1', 1', 1', 1' }. It is assumed here that the number of terminal equipments that may be multiplexed by code division in a PRB is 2, and code division multiplexing (CDM) may only be performed between PSFCHs to which op.2 groupcast corresponds; alternatively, it may be assumed that frequency division multiplexing (FDM) may only be performed between these PSFCHs and PSFCHs to which other services corresponds and between remaining PSFCHs, and so on; however, this disclosure is not limited thereto.

In an embodiment, the relationship between the frequency-domain resources (sub-channels) of the PSSCH and the PSFCHs may be dynamically specified. And the resource blocks of the at least two sidelink feedback channels are indicated by the sidelink control information to which the sidelink data correspond.

For example, still taking FIG. 4 as an example, the sub-channels indicated by 0, 1 and 2 are taken as the frequency-domain starting sub-channels of the PSSCH, and SCI in the PSCCHs to which these PSSCHs correspond indicates respective corresponding PSFCH resources. For example, specifically, the PSFCH resource set includes K PRBs on corresponding symbols of a PSFCH in a current sub-channel, and the SCI indicates which one PRB or more PRBs is/are the PSFCH resource. For unicast data or op.1 groupcast data, a PRB may be indicated; and for op.2 groupcast data, they may be indicated by a starting position+ length (such as an RIV).

In an embodiment, the sidelink control information may at least indicate resource blocks of one or more sidelink feedback channels in the first sidelink feedback channel set to which one sub-channel in one slot corresponds.

For example, the first sidelink feedback channel set includes all sidelink feedback channels to the sub-channels correspond. When the sidelink data are unicast data or the first groupcast data, the sidelink control information indicates a resource block of one sidelink feedback channel in the first sidelink feedback channel set; and when sidelink data are the second groupcast data, the sidelink control information indicates resource blocks of multiple sidelink feedback channels in the first sidelink feedback channel set.

For another example, the number of the multiple sidelink feedback channels is identical to the number of second terminal equipments in the group receiving the second groupcast data (M−1, M being the number of terminal equipments in the group). The multiple sidelink feedback channels can be code-division multiplexed in identical resource blocks, and/or can be frequency-division multiplexed in different resource blocks.

In an embodiment, when the number S of sidelink feedback channels to which the first time-frequency resources correspond is configured per sub-channel, a first time-frequency resource with S greater than or equal to M−1 is selected for performing transmission of the sidelink data; where, M is the number of terminal equipments in the group including the first terminal equipment.

For example, if the number of PSFCHs corresponding to the first time-frequency resources (specific slot and specific sub-channel) corresponding to the PSFCH bundle/group (set 2) is configured per sub-channel, for a group containing M terminal equipments, a specific sub-channel in the first time-frequency resource with a size of a corresponding PSFCH bundle/group greater than or equal to M−1 may only be selected and taken as a frequency-domain starting sub-channel for performing data transmission.

In an embodiment, when the number S of the sidelink feedback channels to which the first time-frequency resources correspond is configured per resource pool, the terminal equipments in the group with M−1 less than or equal to S use the resource pool to transmit the second groupcast data, and terminal equipments in a group with M−1 greater than S cannot use the resource pool to transmit the second groupcast data; where, M is the number of terminal equipments in the group including the first terminal equipment.

For example, if the number of PSFCHs corresponding to the first time-frequency resources (specific slot and specific sub-channel) corresponding to the PSFCH bundle/group (set 2) is configured per sub-channel, only a group with M−1 less than the PSFCH bundle/group size can operate in the op.2 groupcast mode in the current resource pool.

In an embodiment, the resource blocks of multiple sidelink feedback channels (set 1) to which the multiple sidelink data in a period correspond occupy one or more symbols, and these sidelink feedback channels are frequency division multiplexed in the frequency domain.

In an embodiment, the at least two sidelink feedback channels (set 2) to which the first time-frequency resource corresponds may perform code division multiplexing on identical resource blocks according to an intra-group identifier of the terminal equipment, and/or the at least two sidelink feedback channels (set 2) to which the first time-frequency resource corresponds may perform frequency division multiplexing by using different resource blocks according to an intra-group identifier of the terminal equipment.

Figure 5:
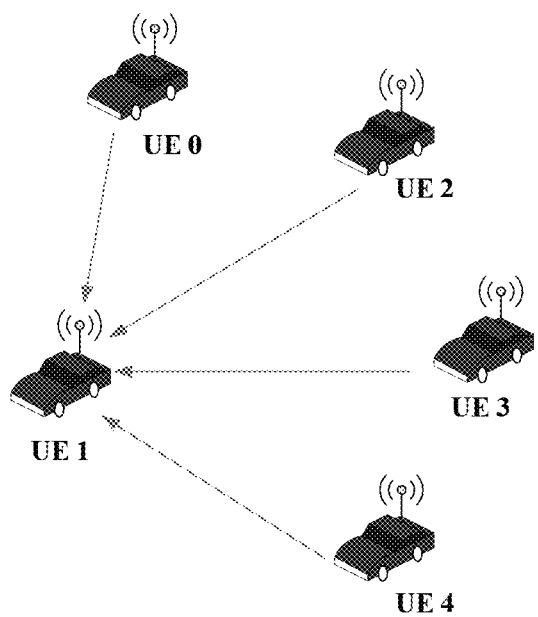
FIG. 5 is an exemplary diagram of performing groupcast of an embodiment of this disclosure.

FIG. 5 is an exemplary diagram of performing groupcast of the embodiment of this disclosure. As shown in FIG. 5, group members include 5 terminal equipments from UE 0 to UE 4. UE 1 is used as a transmitter terminal equipment to transmit the sidelink data to other terminal equipments, and other terminal equipments need to transmit feedback information to UE1.

Figure 6:
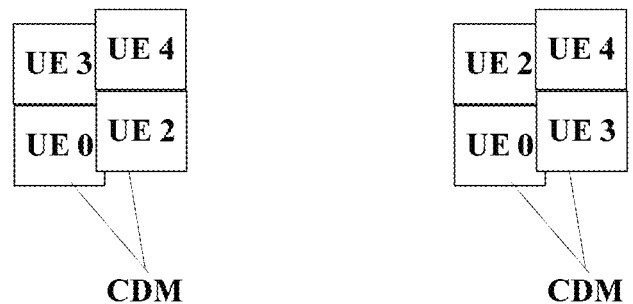
FIG. 6 is another exemplary diagram of the PSFCH resource of the embodiment of this disclosure.

FIG. 6 is another exemplary diagram of the PSFCH resource of the embodiment of this disclosure. As shown in FIG. 6, in a PSFCH bundle, groupcast receiver terminal equipments may be sequentially mapped onto corresponding PSFCH resources according to intra-group numbers, and use the corresponding resources to transmit feedback information.

For example, as shown in the left part of FIG. 6, the mapping is performed in an ascending order of the numbers and code domain first and then frequency domain, that is, after UE 0 is mapped, resources of UE 2 and UE 0 are code-division multiplexed, then resources of UE 3 are mapped adjacently in the frequency domain, and resources of UE 4 and UE 3 are code-division multiplexed.

For another example, as shown in the right part of FIG. 6, the mapping is performed in an ascending order of the numbers and frequency domain first and then code domain, that is, after UE 0 is mapped, resources of UE 2 are mapped adjacently in the frequency domain, resources of UE 3 and UE 0 are code-division multiplexed, and resources of UE 4 and UE 2 are code-division multiplexed.

In an embodiment, when M−1 is less than or equal to S, one or more sidelink feedback channels may be used to repeatedly transmit feedback information of one or more terminal equipments in the group.

For example, if the number of members in the group is M, if M−1 is less than the PSFCH bundle/group size, that is, after PSFCHs of all the group members are mapped, there are still resources remained, the remained resources may be used for repetition, including but not limited to performing repetition on PSFCH resources to which a UE with a smallest ID (for example, the ID is 0) or a largest ID (for example, the ID is M−1) corresponds by all the remained resources; or the remained resources are mapped again in sequence from 0 to M−1, and HARQ-ACK information corresponding to repetitions of the UE is carried.

Figure 7:
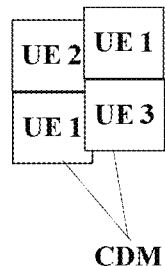
FIG. 7 is a further exemplary diagram of the PSFCH resource of the embodiment of this disclosure.

FIG. 7 is a further exemplary diagram of the PSFCH resource of the embodiment of this disclosure. For example, M is 4, the transmitter terminal equipment is UE 0, and the receiver terminal equipments are UE 1, UE 2 and UE 3, that is, the number of receiver terminal equipments is 3; as shown in FIG. 7, the PSFCH bundle/group size is 4, and after the PSFCHs of all the group members are mapped, there is still one RB remained, which may be used to repeatedly transmit feedback information of UE 1.

In an embodiment, when the sidelink data are unicast data or the first groupcast data and the first terminal equipment selects the first time-frequency resource, one or more sidelink feedback channels to which the first time-frequency resource correspond are used to repeatedly transmit feedback information of the unicast data or first groupcast data.

For example, if the UE transmitting unicast data or op.1 groupcast data selects the configured first time-frequency resource as the PSSCH resource, the HARQ-ACK is repeatedly fed back within one or more resources in the PSFCH bundle or group to which the first time-frequency resource corresponds.

Figure 8:
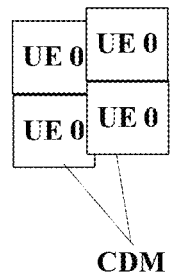
FIG. 8 is still another exemplary diagram of the PSFCH resource of the embodiment of this disclosure.

FIG. 8 is still another exemplary diagram of the PSFCH resource of the embodiment of this disclosure. For example, as shown in FIG. 8, the PSFCH bundle/group size is 4, and if UE 0 selects a PSFCH resource in the PSFCH bundle/group to transmit feedback information, after the PSFCH is mapped, there are still 3 RBs remained, and these 3 RBs may be used to repeatedly transmit feedback information of UE 0.

Configuring the first time-frequency resource in the resource pool is schematically described above, and dynamically avoiding collisions between PSFCH resources by SCI detection shall be schematically described below. The SCI includes sidelink feedback channel information for sidelink data.

In an embodiment, there may exist a fixed relationship between the frequency domain resources (sub-channels) of the PSSCH and the PSFCH. A resource block of one sidelink feedback channel of the at least two sidelink feedback channels is determined by a sub-channel to which the starting position of the sidelink data corresponds; and the sidelink control information may also include the number of sidelink feedback channels of the sidelink data, and optionally, it may further include third indication information for indicating that the sidelink data are the second groupcast data.

For example, for the PSSCH of the transmitter UE of op.2 groupcast, the SCI in the PSCCH to which the PSSCH corresponds may indicate the number of PSFCH channels needed in this time of feedback, the number of the PSFCH channels being equal to the number of UEs in the group minus one. Alternatively, the SCI may also indicate that the op.2 groupcast data are transmitted this time. And reference may be made to the above method for a rule for mapping the receiver UE in the group to a PSFCH at a corresponding position, such as the example in FIG. 4.

In an embodiment, the relationship between the frequency domain resources (sub-channels) of the PSSCH and the PSFCH may be dynamically specified. And the resource blocks of the at least two sidelink feedback channels are indicated by the sidelink control information.

For example, if the correspondence between the sub-channels and the PSFCH is a dynamic correspondence, the feedback may be performed based completely on the PSFCH resources indicated in the SCI.

With the SCI detection, terminal equipments may judge each other whether collisions will occur between the PSFCHs. After two terminal equipments select resources (with identical starting sub-channels) in N slots in identical periods, they may discover collisions between their PSFCH resources via mutual sensing and the SCI detection.

In an embodiment, the terminal equipment may determine whether a collision of the sidelink feedback channels occurs according to the sidelink control information; in the case of determining that a collision of the sidelink feedback channels occurs, it may determine a priority of the sidelink data, and according to the priority of the sidelink data, the feedback of the sidelink data is abandoned or the resources of the sidelink data are reselected.

In an embodiment, the priority of the sidelink data may be determined according to types of the sidelink data and/or ProSe per-packet priorities (PPPPs).

For example, a priority of unicast data is greater than a priority of the second groupcast data, and the priority of the second groupcast data is greater than a priority of the first groupcast data; and if the types of the sidelink data are identical, the PPPPs are compared, the smaller a PPPP value, the higher the priority of the sidelink data.

For another example, the priority of the second groupcast data is greater than a priority of the unicast data, and the priority of the unicast data is greater than the priority of the first groupcast data; and if the types of the sidelink data are identical, the PPPPs are compared, the smaller a PPPP value, the higher the priority of the sidelink data.

For a further example, the PPPPs are compared only, and the smaller a PPPP value, the higher the priority of the sidelink data.

According to the above prioritization, for low-priority service data transmission, the receiver terminal equipment may discard HARQ-ACK bits needing to be fed back, that is, abandoning this time of feedback; or the transmitter terminal equipment may trigger reselection of PSSCH resources.

Figure 9:
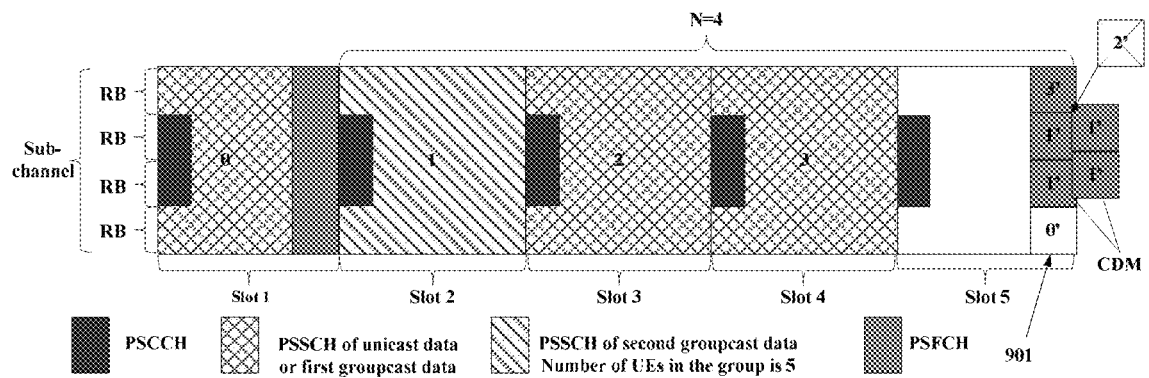
FIG. 9 is yet another exemplary diagram of the PSFCH resource of the embodiment of this disclosure.

FIG. 9 is yet another exemplary diagram of the PSFCH resource of the embodiment of this disclosure. For example, as shown in FIG. 9, if the period N=4, PSFCHs to which "0", "1", "2" and "3" correspond are fed back on one or more symbols shown by 901, and as "1" corresponds to op.2 groupcast, such as corresponding to 4 PSFCHs (assuming that 2 PRBs are occupied), collisions may possibly occur between the PSFCH resource to which "1" corresponds and the PSFCH resource to which "2" corresponds.

As shown in FIG. 9, assuming that the priority of the second groupcast data is greater than the priority of the unicast data, the feedback to which "2" corresponds (indicated by 2') is abandoned, the feedback to which "1" corresponds (indicated by 1') occupies two PRBs and may be code division multiplexed on identical PRBs.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner. And furthermore, the reference numbers in the above implementations are used for distinguishing and for the sake of description, and not intended to limit the number and order of the implementations.

It can be seen from the above embodiments that at least according to one or more frequency-domain resources of the sidelink data, the receiver terminal equipment determines a resource block in which one of at least two sidelink feedback channels for the sidelink data is located. Hence, even though there exists a one-to-many relationship between a PSSCH transmitting the sidelink data and a PSFCH, collision between PSFCH resources may be avoided, and the transmitter terminal equipment may be able to correctly receive feedback information transmitted by the receiver terminal equipment.

Embodiment 2

The embodiments of this disclosure provide a method for transmitting sidelink data, which shall be described from a first terminal equipment side, with contents identical to those in Embodiment 1 being not going to be described herein any further.

Figure 10:
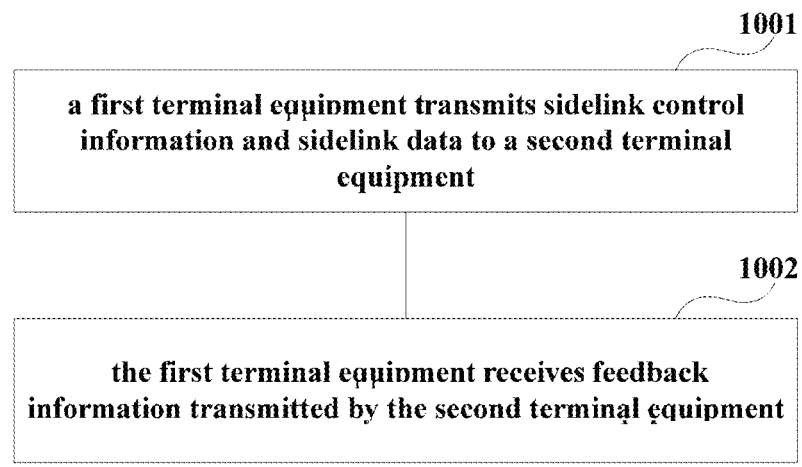
FIG. 10 is a schematic diagram of a method for transmitting sidelink data of an embodiment of this disclosure.

FIG. 10 is a schematic diagram of the method for transmitting sidelink data of the embodiment of this disclosure. As shown in FIG. 10, the method includes:
step 1001: a first terminal equipment transmits sidelink control information and sidelink data to a second terminal equipment;
wherein one or more frequency-domain resources of the sidelink data indicated in the sidelink control information is/are at least used by the second terminal equipment to determine a resource block where one of at least two sidelink feedback channels for the sidelink data is located; and
step 1002: the first terminal equipment receives feedback information transmitted by the second terminal equipment.

It should be noted that FIG. 10 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 10.

In an embodiment, the first terminal equipment and/or the second terminal equipment is/are configured or pre-configured with sidelink resource pool configuration information; wherein the sidelink resource pool configuration information includes first indication information used for indicating that a first time-frequency resource corresponds to at least two sidelink feedback channels. The sidelink resource pool configuration information may be configured by the network device, or may be configured by the terminal equipment (such as the first terminal equipment or other terminal equipments in the group), or may be pre-configured (such as being pre-configured before or after shipment).

In an embodiment, the first time-frequency resource may be selected by the first terminal equipment and taken as a frequency-domain starting resource for transmitting the sidelink data, and is used by the second terminal equipment to determine frequency-domain resources of multiple sidelink feedback channels to which multiple sidelink data in a period correspond.

In an embodiment, when the sidelink data are the second groupcast data, the first terminal equipment selects the first time-frequency resource to determine the frequency domain resource of the sidelink data; and when the sidelink data are unicast data or the first groupcast data, the first terminal equipment selects a second time-frequency resource different from the first time-frequency resource to determine the frequency domain resource of the sidelink data.

In an embodiment, when the sidelink data are unicast data or the first groupcast data, if there are no enough second time-frequency resources, the first terminal equipment selects the first time-frequency resource to determine the frequency-domain resources of sidelink data.

In an embodiment, the sidelink control information includes sidelink feedback channel information for the sidelink data.

In an embodiment, a resource block of one sidelink feedback channel of the at least two sidelink feedback channels is determined via a sub-channel to which the starting position of the sidelink data corresponds, and the sidelink control information includes the number of sidelink feedback channels of the sidelink data.

In an embodiment, resource blocks of the at least two sidelink feedback channels are indicated by the sidelink control information.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that at least according to one or more frequency-domain resources of the sidelink data, the receiver terminal equipment determines a resource block in which one of at least two sidelink feedback channels for the sidelink data is located. Hence, even though there exists a one-to-many relationship between a PSSCH transmitting the sidelink data and a PSFCH, collision between PSFCH resources may be avoided, and the transmitter terminal equipment may be able to correctly receive feedback information transmitted by the receiver terminal equipment.

Embodiment 3

The embodiments of this disclosure provide an apparatus for receiving sidelink data. The apparatus may be, for example, a terminal equipment, or may be one or more components or assemblies configured in a terminal equipment. Contents in this embodiment identical to those in Embodiment 1 shall not be described herein any further.

Figure 11:
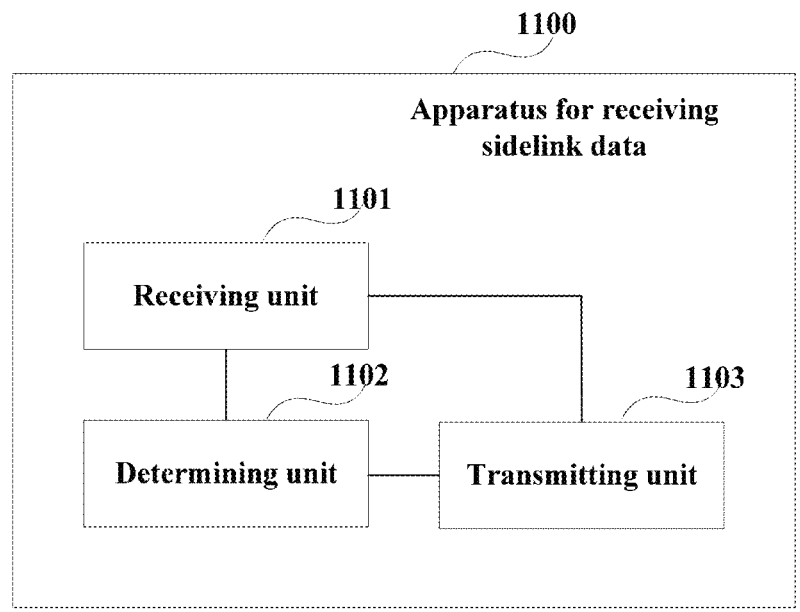
FIG. 11 is a schematic diagram of the apparatus for receiving sidelink data of an embodiment of this disclosure.

FIG. 11 is a schematic diagram of the apparatus for receiving sidelink data of the embodiment of this disclosure. As shown in FIG. 11, an apparatus 1100 for receiving sidelink data includes:

a receiving unit 1101 configured to receive sidelink control information and sidelink data transmitted by a first terminal equipment;

a determining unit 1102 configured to, at least according to one or more frequency-domain resources of the sidelink data indicated in the sidelink control information, determine a resource block in which one of at least two sidelink feedback channels for the sidelink data is located; and a transmitting unit 1103 configured to transmit feedback information to the first terminal equipment by using the sidelink feedback channel.

In an embodiment, the first terminal equipment and/or a second terminal equipment is/are configured or preconfigured with sidelink resource pool configuration information; wherein the sidelink resource pool configuration information includes first indication information used for indicating that a first time-frequency resource corresponds to at least two sidelink feedback channels.

In another embodiment, the sidelink control information includes sidelink feedback channel information for the sidelink data; wherein a resource block of one of the at least two sidelink feedback channels is determined via a sub-channel to which a starting position of the sidelink data correspond, and the sidelink control information includes the number of sidelink feedback channels of the sidelink data; or, the resource blocks of the at least two sidelink feedback channels are indicated via the sidelink control information.

In an embodiment, the determining unit 1102 is further configured to determine whether a sidelink feedback channel collision occurs according to the sidelink control information, determine a priority of the sidelink data when it is determined that a sidelink feedback channel collision occurs, and according to the priority of the sidelink data, that feedback of the sidelink data is abandoned or resources of the sidelink data are reselected.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the apparatus 1100 for receiving sidelink data may further include other components or modules, and reference may be made to related techniques for particulars of these components or modules.

Furthermore, for the sake of simplicity, connection relationships between the components or modules or signal profiles thereof are only illustrated in FIG. 11. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that at least according to one or more frequency-domain resources of the sidelink data, the receiver terminal equipment determines a resource block in which one of at least two sidelink feedback channels for the sidelink data is located. Hence, even though there exists a one-to-many relationship between a PSSCH transmitting the sidelink data and a PSFCH, collision between PSFCH resources may be avoided, and the transmitter terminal equipment may be able to correctly receive feedback information transmitted by the receiver terminal equipment.

Embodiment 4

The embodiments of this disclosure provide an apparatus for transmitting sidelink data. The apparatus may be, for example, a terminal equipment, or may be one or more components or assemblies configured in a terminal equipment. Contents in the embodiments identical to those in embodiments 1 and 2 shall not be described herein any further.

Figure 12:
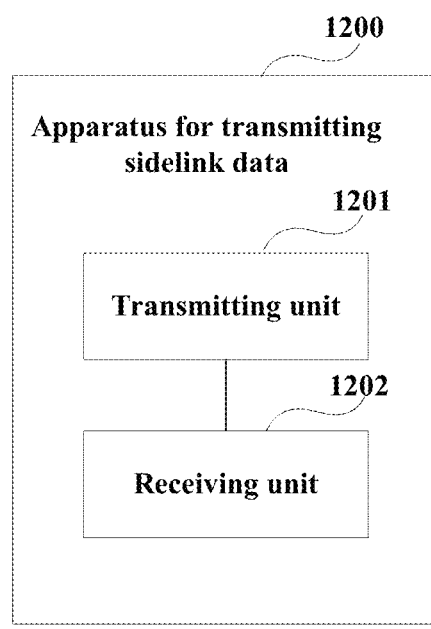
FIG. 12 is a schematic diagram of the apparatus for transmitting sidelink data of an embodiment of this disclosure.

FIG. 12 is a schematic diagram of the apparatus for transmitting sidelink data of the embodiment of this disclosure. As shown in FIG. 12, an apparatus 1200 for transmitting sidelink data includes:

a transmitting unit 1201 configured to transmit sidelink control information and sidelink data to a second terminal equipment; wherein one or more frequency-domain resources of the sidelink data indicated in the sidelink control information is/are at least used by the second terminal equipment to determine a resource block where one of at least two sidelink feedback channels for the sidelink data is located; and a receiving unit 1202 configured to receive feedback information transmitted by the second terminal equipment.

In an embodiment, the first terminal equipment and/or a second terminal equipment is/are configured or preconfigured with sidelink resource pool configuration information; wherein the sidelink resource pool configuration information includes first indication information used for indicating that a first time-frequency resource corresponds to at least two sidelink feedback channels.

In an embodiment, the first time-frequency resource is selected by the first terminal equipment and taken as a frequency-domain starting resource for transmitting the sidelink data, and is used by the second terminal equipment to determine a frequency-domain resource of multiple sidelink feedback channels to which multiple sidelink data in a period correspond.

In an embodiment, when the sidelink data are the second groupcast data, the first terminal equipment selects the first time-frequency resource to determine the frequency domain resource of the sidelink data; and when the sidelink data are unicast data or the first groupcast data, the first terminal equipment selects a second time-frequency resource different from the first time-frequency resource to determine the frequency domain resource of the sidelink data. If there exist no sufficient second time-frequency resources, the first terminal equipment selects the first time-frequency resource to determine the frequency-domain resources of the sidelink data.

In an embodiment, the sidelink control information includes sidelink feedback channel information for the sidelink data. A resource block of one sidelink feedback channel of the at least two sidelink feedback channels is determined via a sub-channel to which the starting position of the sidelink data corresponds, and the sidelink control information includes the number of sidelink feedback channels of the sidelink data.

In an embodiment, resource blocks of the at least two sidelink feedback channels are indicated by the sidelink control information.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the apparatus 1200 for transmitting sidelink data may further include other components or modules, and reference may be made to related techniques for particulars of these components or modules.

Furthermore, for the sake of simplicity, connection relationships between the components or modules or signal profiles thereof are only illustrated in FIG. 12. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that at least according to one or more frequency-domain resources of the sidelink data, the receiver terminal equipment determines a resource block in which one of at least two sidelink feedback channels for the sidelink data is located. Hence, even though there exists a one-to-many relationship between a PSSCH transmitting the sidelink data and a PSFCH, collision between PSFCH resources may be avoided, and the transmitter terminal equipment may be able to correctly receive feedback information transmitted by the receiver terminal equipment.

Embodiment 5

The embodiments of this disclosure provide a communication system, and reference may be made to FIG. 1, with contents identical to those in embodiments 1-4 being not going to be described herein any further.

In an embodiment, the communication system 100 may at least include:
a first terminal equipment 102 configured to transmit sidelink control information and sidelink data to a second terminal equipment 103, and receive feedback information transmitted by the second terminal equipment 103; and
the second terminal equipment 103 configured to receive the sidelink control information and the sidelink data, at least according to one or more frequency-domain resources of the sidelink data indicated in the sidelink control information, determine a resource block in which one of at least two sidelink feedback channels for the sidelink data is located, and transmit the feedback information by using the sidelink feedback channel.

The embodiment of this disclosure further provides a network device, which may be, for example, a base station. However, this disclosure is not limited thereto, and it may also be another network device.

Figure 13:
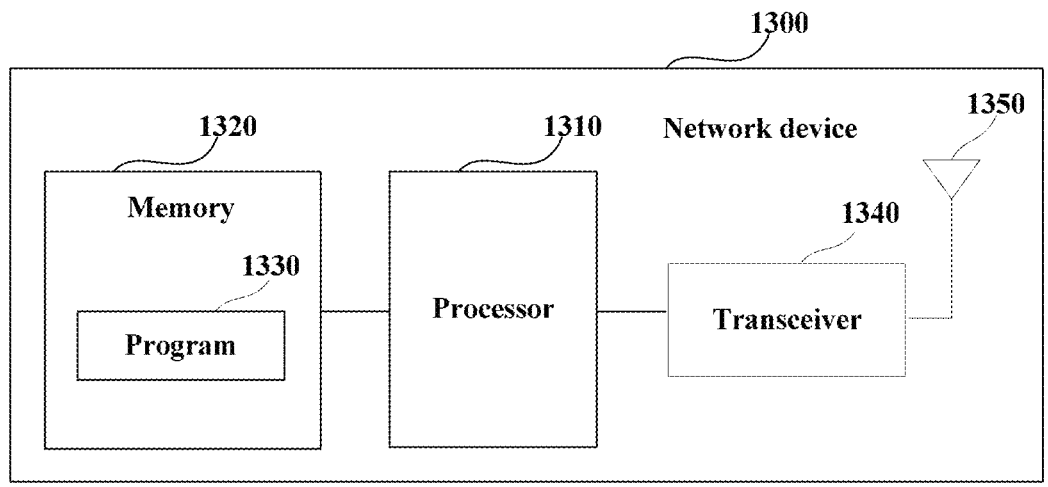
FIG. 13 is a schematic diagram of the network device of an embodiment of this disclosure.

FIG. 13 is a schematic diagram of a structure the network device of the embodiment of this disclosure. As shown in FIG. 13, a network device 1300 may include a processor 1310 (such as a central processing unit (CPU)) and a memory 1320, the memory 1320 being coupled to the processor 1310. The memory 1320 may store various data, and furthermore, it may store a program 1330 for data processing, and execute the program 1330 under control of the processor 1310.

Furthermore, as shown in FIG. 13, the network device 1300 may include a transceiver 1340, and an antenna 1350, etc. Functions of the above components are similar to those in the relevant art, and shall not be described herein any further. It should be noted that the network device 1300 does not necessarily include all the parts shown in FIG. 13, and furthermore, the network device 1300 may include parts not shown in FIG. 13, and the relevant art may be referred to.

The embodiment of this disclosure further provides a terminal equipment; however, this disclosure is not limited thereto, and it may also be another equipment.

Figure 14:
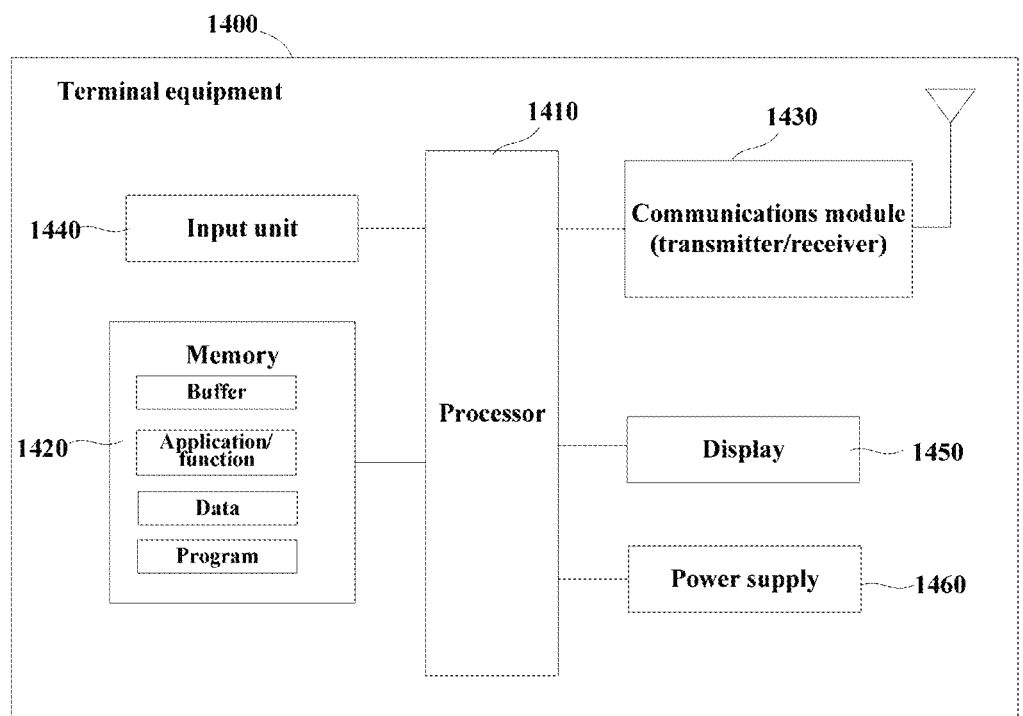
FIG. 14 is a schematic diagram of the terminal equipment of an embodiment of this disclosure.

FIG. 14 is a schematic diagram of the terminal equipment of the embodiment of this disclosure. As shown in FIG. 14, a terminal equipment 1400 may include a processor 1410 and a memory 1420, the memory 1420 storing data and a program and being coupled to the processor 1410. It should be noted that this figure is illustrative only, and other types of structures may also be used, so as to supplement or replace this structure and achieve a telecommunications function or other functions.

For example, the processor 1410 may be configured to execute a program to carry out the method for receiving sidelink data as described in Embodiment 1. For example, the processor 1410 may be configured to perform the following control: receiving sidelink control information and sidelink data transmitted by a first terminal equipment; at least according to one or more frequency-domain resources of the sidelink data indicated in the sidelink control information, determining a resource block in which one of at least two sidelink feedback channels for the sidelink data is located; and transmitting feedback information to the first terminal equipment by using the sidelink feedback channel.

For another example, the processor 1410 may be configured to execute a program to carry out the method for transmitting sidelink data as described in Embodiment 2. For example, the processor 1410 may be configured to perform the following control: transmitting sidelink control information and sidelink data to a second terminal equipment; wherein one or more frequency-domain resources of the sidelink data indicated in the sidelink control information is/are at least used by the second terminal equipment to determine a resource block where one of at least two sidelink feedback channels for the sidelink data is located; and receiving feedback information transmitted by the second terminal equipment.

As shown in FIG. 14, the terminal equipment 1400 may further include a communication module 1430, an input unit 1440, a display 1450, and a power supply 1460; wherein functions of the above components are similar to those in the relevant art, which shall not be described herein any further. It should be noted that the terminal equipment 1400 does not necessarily include all the parts shown in FIG. 14, and the above components are not necessary. Furthermore, the terminal equipment 1400 may include parts not shown in FIG. 14, and the relevant art may be referred to.

An embodiment of this disclosure provides a computer program, which, when executed in a terminal equipment, will cause the terminal equipment to carry out the method for receiving sidelink data as described in Embodiment 1 or the method for transmitting sidelink data as described in Embodiment 2.

An embodiment of this disclosure provides a storage medium, including a computer program, which will cause a terminal equipment to carry out the method for receiving sidelink data as described in Embodiment 1 or the method for transmitting sidelink data as described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A method for receiving sidelink data, including:
receiving, by a second terminal equipment, sidelink control information and sidelink data transmitted by a first terminal equipment;
at least according to one or more frequency-domain resources of the sidelink data indicated in the sidelink control information, determining, by the second terminal equipment, a resource block in which one of at least two sidelink feedback channels for the sidelink data is located; and
transmitting feedback information to the first terminal equipment by the second terminal equipment by using the sidelink feedback channel.

Supplement 2. The method according to supplement 1, wherein the sidelink data include one of the following: unicast data, first groupcast data, and second groupcast data,
the unicast data being transmitted by the first terminal equipment to a second terminal equipment,
the first groupcast data being transmitted by the first terminal equipment to at least two second terminal equipments, the at least two second terminal equipments transmitting feedback information in the same sidelink feedback channel,
and the second groupcast data being transmitted by the first terminal equipment to at least two second terminal equipments, the at least two second terminal equipments respectively transmitting feedback information in at least two sidelink feedback channels.

Supplement 3. The method according to supplement 1 or 2, wherein the first terminal equipment and/or a second terminal equipment is/are configured or preconfigured with sidelink resource pool configuration information; and wherein the sidelink resource pool configuration information includes first indication information used for indicating that a first time-frequency resource corresponds to at least two sidelink feedback channels.

Supplement 4. The method according to supplement 3, wherein the first time-frequency resource is selected by the first terminal equipment and is taken as a frequency-domain starting resource for transmitting the sidelink data, and is used by the second terminal equipments to determine frequency-domain resources of a plurality of sidelink feedback channels to which a plurality of sidelink data in a period correspond.

Supplement 5. The method according to supplement 3 or 4, wherein the sidelink resource pool configuration information further includes information on the number of the at least two sidelink feedback channels.

Supplement 6. The method according to supplement 5, wherein numbers of sidelink feedback channels to which any two first time-frequency resources configured in the sidelink resource pool configuration information correspond are identical, or numbers of sidelink feedback channels to which any two first time-frequency resources configured in the sidelink resource pool configuration information correspond are different;

Supplement 7. The method according to supplement 5, wherein numbers of sidelink feedback channels to which at least two first time-frequency resources configured in the sidelink resource pool configuration information correspond are different, and/or numbers of sidelink feedback channels to which at least two first time-frequency resources correspond are identical.

Supplement 8. The method according to any one of supplements 3-7, wherein the sidelink resource pool configuration information includes second indication information used for indicating whether a sidelink resource pool is used for second groupcast data, and that the first indication information is able to be included in the sidelink resource pool configuration information or be determined to be valid by the second terminal equipments when the resource pool configuration information includes the second indication information.

Supplement 9. The method according to any one of supplements 3-8, wherein the sidelink resource pool configuration information is configured for each one or more periods in a time domain; and wherein the sidelink resource pool configuration information configures one or more first sub-channels for one or more slots in a period.

Supplement 10. The method according to any one of supplements 3-9, wherein one first time-frequency resource corresponds to a second sidelink feedback channel set for second groupcast data, the second sidelink feedback channel set including a plurality of sidelink feedback channels.

Supplement 11. The method according to supplement 10, wherein a part of sub-channels of the one or more slots are first sub-channels and correspond to the second sidelink feedback channel set, or all sub-channels of the one or more slots are first sub-channels and correspond to the second sidelink feedback channel set.

Supplement 12. The method according to any one of supplements 3-11, wherein in a case where the sidelink data are second groupcast data, the first terminal equipment selects the first time-frequency resource to determine one or more frequency-domain resources of the sidelink data; and in a case where the sidelink data are unicast data or first groupcast data, the first terminal equipment selects a second time-frequency resource different from the first time-frequency resource to determine one or more frequency-domain resources of the sidelink data.

Supplement 13. The method according to supplement 12, wherein in a case where the sidelink data are unicast data or first groupcast data, if there exists no enough second time-frequency resource, the first terminal equipment selects the first time-frequency resource again to determine the frequency-domain resources of the sidelink data.

Supplement 14. The method according to any one of supplements 3-13, wherein a resource block of at least one of the at least two sidelink feedback channels is determined via a sub-channel to which a starting position of the sidelink data corresponds.

Supplement 15. The method according to supplement 14, wherein resource blocks of other sidelink feedback channels of the at least two sidelink feedback channels are at least determined via the resource block of the at least one sidelink feedback channel.

Supplement 16. The method according to any one of supplements 3-13, wherein the resource blocks of the at least two sidelink feedback channels are indicated via sidelink control information to which the sidelink data correspond.

Supplement 17. The method according to any one of supplements 3-16, wherein the sidelink control information at least indicates that a sub-channel of a slot corresponds to one or more resource blocks of which one or more sidelink feedback channels in a first sidelink feedback channel set.

Supplement 18. The method according to any one of supplements 3-17, wherein the at least two sidelink feedback channels to which the first time-frequency resource corresponds perform code-division multiplexing on the same resource block according to an intra-group identifier of a terminal equipment, and/or, the at least two sidelink feedback channels to which the first time-frequency resource corresponds perform frequency-division multiplexing by using different resource blocks according to an intra-group identifier of a terminal equipment.

Supplement 19. The method according to any one of supplements 3-18, wherein resource blocks of a plurality of sidelink feedback channels to which a plurality of sidelink data within a period correspond occupy one or more symbols, and the plurality of sidelink feedback channels are frequency-division multiplexed in a frequency domain.

Supplement 20. The method according to any one of supplements 3-19, wherein when the number S of the sidelink feedback channels to which the first time-frequency resource corresponds is configured every sub-channel, a first time-frequency resource with S greater than or equal to M−1 is selected for performing transmission of the sidelink data; where, M is the number of terminal equipments in a group including the first terminal equipment.

Supplement 21. The method according to any one of supplements 3-19, wherein when the number S of the sidelink feedback channels to which the first time-frequency resource corresponds is configured every resource pool, a terminal equipment in a group with M−1 less than or equal to S uses the resource pool to transmit the second groupcast data, and a terminal equipment in a group with M−1 greater than S is not able to use the resource pool to transmit the second groupcast data; where, M is the number of terminal equipments in the group including the first terminal equipment.

Supplement 22. The method according to supplement 20 or 21, wherein in a case where M−1 is less than or equal to S, one or more of the sidelink feedback channels are used to repeatedly transmit feedback information of one or more terminal equipments in the group.

Supplement 23. The method according to supplement 13, wherein in a case where the sidelink data are the unicast data or the first groupcast data and the first terminal equipment selects the first time-frequency resource, one or more sidelink feedback channels to which the first time-frequency resource corresponds is/are used for repeatedly transmitting feedback information of the unicast data or the first groupcast data.

Supplement 24. The method according to supplement 1 or 2, wherein the sidelink control information includes sidelink feedback channel information for the sidelink data.

Supplement 25. The method according to supplement 24, wherein a resource block of one of the at least two sidelink feedback channels is determined via a sub-channel to which a starting position of the sidelink data correspond, and the sidelink control information includes the number of sidelink feedback channels of the sidelink data.

Supplement 26. The method according to supplement 25, wherein the sidelink control information further includes third indication information used for indicating that the sidelink data are the second groupcast data.

Supplement 27. The method according to supplement 24, wherein the resource blocks of the at least two sidelink feedback channels are indicated via the sidelink control information, and the sidelink control information further indicates resource blocks of all the corresponding sidelink feedback channels.

Supplement 28. The method according to any one of supplements 24-27, wherein the method further includes:
 determining whether a sidelink feedback channel collision occurs according to the sidelink control information;
 determining a priority of the sidelink data when it is determined that a sidelink feedback channel collision occurs; and
 abandoning feedback of the sidelink data or reselecting resources of the sidelink data according to the priority of the sidelink data.

Supplement 29. The method according to supplement 28, wherein the priority of the sidelink data is determined according to a type of the sidelink data and/or a priority of a prose per-packet priority (PPPP).

Supplement 30. The method according to supplement 29, wherein a priority of unicast data is greater than a priority of second groupcast data, and the priority of the second groupcast data is greater than a priority of first groupcast data; and/or
 the priority of the second groupcast data is greater than the priority of the unicast data, and the priority of the unicast data is greater than the priority of the first groupcast data; and/or
 the smaller a value of PPPP, the higher the priority of the sidelink data.

Supplement 31. A method for receiving sidelink data, including:
 receiving, by a second terminal equipment, sidelink control information and sidelink data transmitted by a first terminal equipment;
 at least according to one or more frequency-domain resources of the sidelink data indicated in the sidelink control information, determining, by the second terminal equipment, a resource block in which one of at least two sidelink feedback channels for the sidelink data is located; and
 transmitting feedback information to the first terminal equipment by the second terminal equipment by using the sidelink feedback channel;
 wherein the sidelink control information at least indicates that a sub-channel of a slot corresponds to one or more resource blocks of which one or more sidelink feedback channels in a first sidelink feedback channel set.

Supplement 32. The method according to supplement 31, wherein the first sidelink feedback channel set includes all sidelink feedback channels to which the sub-channels correspond.

Supplement 33. The method according to supplement 31 or 32, wherein when the sidelink data are unicast data or the first groupcast data, the sidelink control information indicates a resource block of one sidelink feedback channel in the first sidelink feedback channel set.

Supplement 34. The method according to supplement 31 or 32, wherein when the sidelink data are the second groupcast data, the sidelink control information indicates resource blocks of multiple sidelink feedback channels in the first sidelink feedback channel set.

Supplement 35. The method according to supplement 34, wherein the number of the multiple sidelink feedback channels is identical to the number of second terminal equipments in the group receiving the second groupcast data.

Supplement 36. The method according to supplement 34, wherein the multiple sidelink feedback channels is able to perform code-division multiplexing in identical resource blocks, and/or is able to perform frequency-division multiplexing in different resource blocks.

Supplement 37. A method for transmitting sidelink data, including:
 transmitting sidelink control information and sidelink data by a first terminal equipment to a second terminal equipment; wherein one or more frequency-domain resources of the sidelink data indicated in the sidelink control information is/are at least used by the second terminal equipment to determine a resource block where one of at least two sidelink feedback channels for the sidelink data is located; and
 receiving, by the first terminal equipment, feedback information transmitted by the second terminal equipment.

Supplement 38. The method according to supplement 37, wherein the first terminal equipment and/or the second terminal equipment are configured or pre-configured with sidelink resource pool configuration information; wherein the sidelink resource pool configuration information includes first indication information used for indicating that one first time-frequency resource corresponds to at least two sidelink feedback channels.

Supplement 39. The method according to supplement 38, wherein the first time-frequency resource is selected by the first terminal equipment and is taken as a frequency-domain starting resource for transmitting the sidelink data, and is used by the second terminal equipments to determine frequency-domain resources of a plurality of sidelink feedback channels to which a plurality of sidelink data in a period correspond.

Supplement 40. The method according to supplement 38 or 39, wherein in a case where the sidelink data are second groupcast data, the first terminal equipment selects the first time-frequency resource to determine one or more frequency-domain resources of the sidelink data;
 and in a case where the sidelink data are unicast data or first groupcast data, the first terminal equipment selects a second time-frequency resource different from the first time-frequency resource to determine one or more frequency-domain resources of the sidelink data.

Supplement 41. The method according to supplement 40, wherein in a case where the sidelink data are the unicast data or the first groupcast data, if there exists no enough second time-frequency resource, the first terminal equipment selects the first time-frequency resource to determine the frequency domain resource of the sidelink data.

Supplement 42. The method according to supplement 37, wherein the sidelink control information includes sidelink feedback channel information for the sidelink data.

Supplement 43. The method according to supplement 42, wherein a resource block of one sidelink feedback channel in the at least two sidelink feedback channels is determined by a sub-channel to which a starting position of the sidelink data corresponds;
 and the sidelink control information includes the number of sidelink feedback channels of the sidelink data.

Supplement 44. The method according to supplement 42, wherein resource blocks of the at least two sidelink feedback channels are indicated by the sidelink control information.

Supplement 45. A method for transmitting sidelink data, including:
transmitting sidelink control information and sidelink data by a first terminal equipment to a second terminal equipment; wherein one or more frequency-domain resources of the sidelink data indicated in the sidelink control information is/are at least used by the second terminal equipment to determine a resource block where one of at least two sidelink feedback channels for the sidelink data is located; and
receiving, by the first terminal equipment, feedback information transmitted by the second terminal equipment;
wherein the sidelink control information at least indicates that a sub-channel of a slot corresponds to one or more resource blocks of which one or more sidelink feedback channels in a first sidelink feedback channel set.

Supplement 46. A terminal equipment, including a memory and a processor, the memory storing a computer program, and the processor being configured to execute the computer program to carry out the method for receiving sidelink data as described in any one of supplements 1-36, or carry out the method for transmitting sidelink data as described in any one of supplements 37-45.

What is claimed is:

1. An apparatus for performing sidelink data communication, comprising:
a memory that stores a plurality of instructions; and
processor circuitry coupled to the memory and configured to execute the instructions to
receive sidelink control information and sidelink data transmitted by a first terminal equipment, the sidelink data being received by at least two second terminal equipments, and the sidelink control information comprising information on at least one frequency-domain resource of the sidelink data and a group cast information;
obtain a feedback resource set in which at least two sidelink feedback channels for the sidelink data is located, according to the information on at least one frequency-domain resource of the sidelink data;
determine a resource of sidelink feedback channel in the feedback resource set for a second terminal equipment according the sidelink control information; and
transmit feedback information to the first terminal equipment by using the sidelink feedback channel,
wherein when the group cast information indicates that the sidelink data is a first group cast data, the resource of sidelink feedback channel in the feedback resource set is determined based on the at least one frequency-domain resource of the sidelink data, and
when the group cast information indicates that the sidelink data is a second group cast data, the resource of sidelink feedback channel in the feedback resource set is determined based on the at least one frequency-domain resource of the sidelink data and an intragroup identifier of a terminal equipment;
wherein when the number of terminal equipment in a group is less than or equal to the number of the sidelink feedback channels corresponds to a first time-frequency resource in a sidelink resource pool, at least two second terminal equipment are configured to transmit feedback information by using a same sidelink feedback channel or by using at least two respective sidelink feedback channels, and
when the number of terminal equipment in a group is larger than the number of the sidelink feedback channels corresponds to a first time-frequency resource in the sidelink resource pool, at least two second terminal equipments are configured to transmit feedback information by using a same sidelink feedback channel.

2. The apparatus according to claim 1, wherein the sidelink data comprise one of the following: unicast data, first groupcast data, and second groupcast data,
the unicast data is transmitted by the first terminal equipment to a second terminal equipment,
the first groupcast data is transmitted by the first terminal equipment to at least two second terminal equipments, and the at least two second terminal equipments transmit feedback information in the same sidelink feedback channel, and
the second groupcast data is transmitted by the first terminal equipment to at least two second terminal equipments, the at least two second terminal equipments respectively transmit feedback information in at least two sidelink feedback channels.

3. The apparatus according to claim 1,
wherein the processor circuitry is configured to
transmit feedback information using code-division multiplex sequence according to the group cast information and the intragroup identifier.

4. The apparatus according to claim 1,
wherein the first terminal equipment and/or a second terminal equipment is/are configured or preconfigured with sidelink resource pool configuration information, and
the sidelink resource pool configuration information comprises first indication information used for indicating that a first time-frequency resource corresponds to the feedback resource set for conveying at least two sidelink feedback channels.

5. The apparatus according to claim 4,
wherein the sidelink resource pool configuration information further comprises a second indication information used for indicating a number of the sidelink feedback channels in the feedback resource set.

6. The apparatus according to claim 4,
wherein the number of the feedback channels corresponding to a first time-frequency resource configured in the sidelink resource pool configuration information is identical to the number of the feedback channels corresponding to another first time-frequency resource configured in the sidelink resource pool configuration information.

7. The apparatus according to claim 1,
wherein a first time-frequency resource is selected by the first terminal equipment and is taken as a frequency-domain starting position for transmitting the sidelink data.

8. The apparatus according to claim 1,
wherein the processor circuitry is configured to obtain the feedback resource set from a sub-channel to which a starting position of the sidelink data corresponds.

9. A communication system, comprising:
a first terminal equipment configured to transmit sidelink control information and sidelink data, the sidelink control information comprising information on at least one frequency-domain resource of the sidelink data and a group cast information; and a second terminal equipment configured to receive the sidelink control information and the sidelink data, obtain a feedback resource set in which at least two sidelink feedback channels for the sidelink data is located according to the information on at least one frequency-domain resource of the sidelink data, determine a resource of sidelink feedback channel in the feedback resource set for the second terminal equipment according the sidelink control information, and transmit feedback information to the first terminal equipment by using the sidelink feedback channel, wherein when the group cast information indicates that the sidelink data is a first group cast data, the resource of sidelink feedback channel in the feedback resource set is determined based on the at least one frequency-domain resource of the sidelink data, and when the group cast information indicates that the sidelink data is a second group cast data, the resource of sidelink feedback channel in the feedback resource set is determined based on the at least one frequency-domain resource of the sidelink data and an intragroup identifier of a terminal equipment;

wherein when the number of terminal equipment in a group is less than or equal to the number of the sidelink feedback channels corresponds to a first time-frequency resource in a sidelink resource pool, at least two second terminal equipment are configured to transmit feedback information by using a same sidelink feedback channel or by using at least two respective sidelink feedback channels, and when the number of terminal equipment in a group is larger than the number of the sidelink feedback channels corresponds to a first time-frequency resource in the sidelink resource pool, at least two second terminal equipments are configured to transmit feedback information by using a same sidelink feedback channel.

10. The system according to claim 9, wherein the first terminal equipment and/or the second terminal equipment is/are configured or preconfigured with sidelink resource pool configuration information, and the sidelink resource pool configuration information comprises first indication information used for indicating that a first time-frequency resource corresponds to the feedback resource set for conveying at least two sidelink feedback channels.

11. The system according to claim 10, wherein the at least two sidelink feedback channels in the feedback resource set to which the first time-frequency resource corresponds are code-division multiplexed on the same resource block according to an intra-group identifier of a terminal equipment, and/or, the at least two sidelink feedback channels to which the first time-frequency resource corresponds are frequency-division multiplexed by using different resource blocks according to an intra-group identifier of a terminal equipment.

12. The system according to claim 9, wherein a first time-frequency resource is selected by the first terminal equipment and is taken as a frequency-domain starting position for transmitting the sidelink data.

* * * * *